United States Patent
Schlosser

[15] 3,688,604
[45] Sept. 5, 1972

[54] REVERSING GEAR

[72] Inventor: Günther Schlosser, Fachingen-Saar, Germany

[73] Assignees: Walter Gutbrod; Wolfgang Gutbrod; Gutbrod-Werke G.m.b.H., Bubingen, Saar, Germany

[22] Filed: May 5, 1970

[21] Appl. No.: 34,826

[30] Foreign Application Priority Data

May 7, 1969    Germany..........P 19 23 163.1

[52] U.S. Cl. .......................74/792, 74/203, 74/220
[51] Int. Cl. .......................F16h 57/10, F16h 9/26
[58] Field of Search........74/220, 792, 218, 203, 376; 192/11

[56] References Cited

UNITED STATES PATENTS

| 1,780,475 | 11/1930 | Gold et al. | 74/218 |
| 3,132,539 | 5/1964 | Hotz | 74/792 |
| 2,957,561 | 10/1960 | Musgrave | 192/11 |
| 3,539,040 | 11/1970 | Edwards | 192/11 X |
| 504,770 | 9/1893 | Witherell | 74/792 X |
| 1,515,068 | 11/1924 | Palm | 74/792 |
| 1,811,038 | 6/1931 | Amidon | 74/220 |

Primary Examiner—Carlton R. Croyle
Assistant Examiner—Thomas C. Perry
Attorney—Harness, Dickey & Pierce

[57] ABSTRACT

A transmission comprising an epicyclic gear train with a belt pulley drive which provides a speed reduction during reverse rotation, and control mechanism which operates in common with a brake jaw, which retards the rotary movement of the planetary gear carrier, and a belt engaging member which directs the motion of the epicyclic gear train.

12 Claims, 6 Drawing Figures ly known a belt pulley reversing gear
REVERSING GEAR

SUMMARY AND BACKGROUND OF THE INVENTION

The invention relates generally to a reversing gear with belt pulley drive, and more particularly to a gear and drive assembly having a geared-down backward rotation by means of a planetary drive whose satellites-carrier can be arrested.

It has been found that such gears are particularly suitable for use in vehicles, because among other things, of the ease of reversing them from forward to backward drive. The use of such gears are, in many cases, more suitable than the traditional spur gear or bevel gear drives.

There is known in the art a belt pulley reversing gear with which the belt pulley is mounted, by means of rollers, on the hub of the shaft that is to be driven, and the trunnions of the rollers are utilized at the same time as trunnions for the intermediate wheels. In this case however, the power flow must be interrupted and a dog clutch must be shifted during the reversal to backward rotation. Moreover, the liability to derangement of this known drive is great.

There is furthermore known a belt pulley change-speed and reversing gear transmission, a so-called flat belt transmission, with which the drive belt is shifted from one pulley over a loose pulley to a third pulley that produces the backward drive through the intermediary of a planetary system. This system was usual in earlier transmissions. In the case of this known transmission, the transmission may be shifted to backward running operation in two stages by means of a pulling wedge. Such a drive is heavy and requires much space. Its use is indicated only for the transmission of turning moments for machine units installed immovably.

One purpose of the invention is to propose a belt drive reversing gear which is characterized by its simple method of construction; that is, it has a small number of precision elements, which operate reliably, and which is therefore particularly suitable for large-scale manufacture of, for example automobiles and tractors. In particular in the case of small tractors, such as garden tractors, such transmissions can contribute to reducing the cost of manufacture, and to simplifying the operation and servicing of the assembly. In this latter case, the use of the improved transmission can contribute to avoiding derangements resulting from unskilled operation or servicing of the implement.

The invention is characterized by at least two torque-transmitting rotational elements, one of which is mounted on the shaft driving the sun wheel and the other is connected to the satellites-carrier. The two rotational elements described above are, as disclosed, V-belt pulleys, whereby, in accordance with the invention, one of the belt drives has a tautening device associated with it.

It lies within the scope of the invention to operate the arresting device for the satellites-carrier and the belt-tautening device by means of a common regulating organ, This characteristic of the invention is important for technically correct manipulation of the belt drive during a reversal of the direction of rotation. It moreover favors housing the operating and servicing elements for the drive in a small space, which in building vehicles, and in particular in building small tractors, results in special advantages.

One object of this invention then is to provide an improved reversing gear with a belt pulley drive.

Another object of the present invention is the provision of an apparatus of the type described which may be installed in small vehicles where space limitations are present and which may be operated and serviced by the unskilled operator of such an implement.

A further object of this invention is to provide a reversing gear with a simple method of construction and a small number of precision parts which would be particularly suitable for large scale manufacture as required in the small self-propelled vehicular field.

An additional object of this invention is to provide a transmission for small self-propelled vehicles which will provide cost reduction over conventional transmissions which are presently employed by the industry.

A still further object is to provide a reversing gear with a belt pulley drive which because of its simplicity will be relatively free from malfunction or derangement.

Further objects, features and advantages of this invention will become apparent from a consideration of the following description, the appended claims and the accompanying drawings in which:

The drawings described in the following show two examples of construction of the invention.

Figure 1:
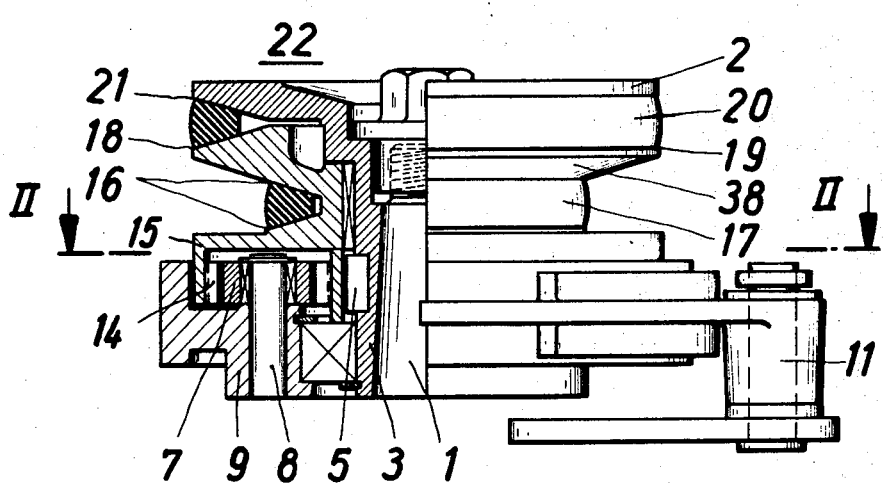
FIG. 1 shows a schematically illustrated reversing gear for the transmission of a turning moment, showing it partly in section and partly in a plan view.

Referring now to the drawings, there is disclosed a transmission assembly 22 including a driven stub axle 1, and a disk-type pulley 2. The disk-type pulley 2 includes a long hub 3 fixedly disposed on the stub axle by means of a fastening screw assembly. A sun wheel 6 is fastened to the hub 3 by means of splines 5, the sun wheel 6 forming part of a planetary drive, the satellites 7 of the planetary drive being mounted on trunnions 8 in a satellites-carrier 9. The outer periphery of that carrier 9 forms a braking surface 10, against which there can be applied a brake jaw 12, the jaw 12 being pivotable about the pivot point or articulation 11. The brake jaw is, in the usual way, provided with a brake lining 13.

The satellites 7 mesh with an internal gear 14 of a bell 15, disposed rotatably in the satellites-carrier 9. This bell 15 is formed with a V-belt groove 16 for the V-belt 17. The outside, or upper edge in FIG.1, of the bell 15, with its V-belt groove 16, is made conical, and it forms the inner flank 18 of a second V-belt groove 19 for the V-belt 20. The second flank 21 of the V-belt groove 19 is formed by the inner side of the disk-type pulley 2 which is fastened to the stub-axle 1.

Thus the disk-type pulley 2 and the outer side of the bell 15 form a double-grooved V-belt pulley.

Figure 3:
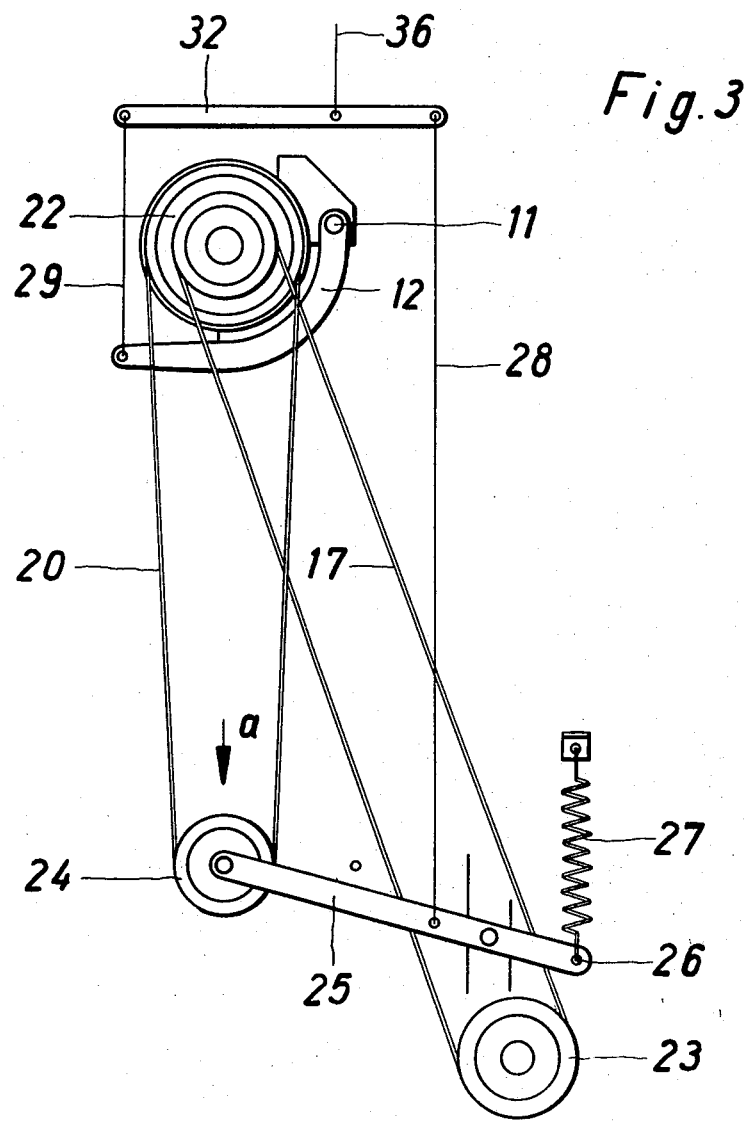
FIG. 3 shows how the belts are associated with the transmission of FIGS. 1 and 2.

FIG. 3 shows the actuating means for running of the two V-belts 17 and 20 from the drive 22 described above to the driven pulley 23 and including a tautening roller 24, the latter being mounted at the end of a longer end or arm 25 of a two-armed lever. A coil spring 27 engages a shorter end or arm 26 of this lever, which loads the lever arm 25 in the tautening direction a of the roller 24. The control of roller 24 is established through a lever 32 and cable 36, and, when the pull cable 36 is pulled, the tautening roller 24 becomes moved through the intermediary of the regulating element 32 (a lever), and the cable 28 becomes moved counter to the tautening direction a of the pull spring 27; that is, the V-belt 20 becomes slackened.

The end of the brake jaw 12, which is able to pivot about the articulation point 11, is connected with one pull cable 29, and can during this cable's tautening, through the intermediary of the regulating organ 32 (lever) and the pull cable 36, become pressed firmly against the brake surface 10 (FIG. 2) of the planets-carrier 9, through which the rotation of this carrier becomes prevented.

The way in which the transmission 22 works is as follows:

With the V-belt 20 taut and the brake 12, 13 loose, the rotary movement introduced from the drive shaft 1 is transmitted, to the second flank 18 of the bell 15 through the intermediary of the disk-type pulley 2, against whose flank 21 the V-belt 20 bears, and through the intermediary of this belt 20. Against this bell there bears, in the second V-belt groove 16, the second V-belt 17 that runs to the drive pulley 23. The entire planetary reduction gear, as a result of the frictional resistance between the satellite wheels 7 and the inner sun wheel 6 on the one hand, and with the outer ring gear 14 on the other hand, rotates with the unchanged speed of the drive shaft 1. Thus the rapid forward movement is initiated.

Figure 2:
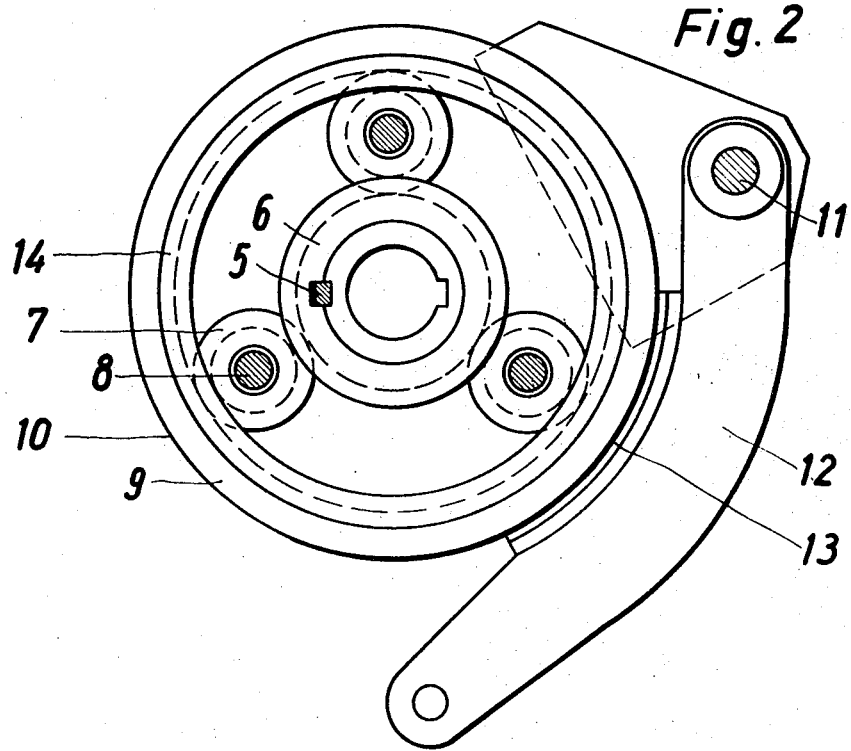
FIG. 2 shows the transmission of FIG. 1 in a section along line II—II.

With the V-belt 20 slackened and the brake jaw 12 applied, the inner flank of the V-belt 20, as a result of insufficient friction against the flank 18 of the bell 15, is unable to set that bell rotating in the same direction. Thus, the introduced rotation, because the satellites-carrier 9 is braked and does not co-rotate, is, set into contrary and geared-down rotation by means of the planetary drive through the intermediary of the sun wheel 6, fastened on the shaft 1, and the satellites 7. This rotational moment is transmitted, through the intermediary of the bell 15, the V-belt groove 16 and the V-belt 17, to the drive pulley 23 (FIG. 2). The backward movement, which is geared down relatively to the forward movement, has come into action. With the V-belt 20 slackened and the brake jaw 12 loose, the planetary drive rotates idly. Idling has been shifted to.

Figure 4:
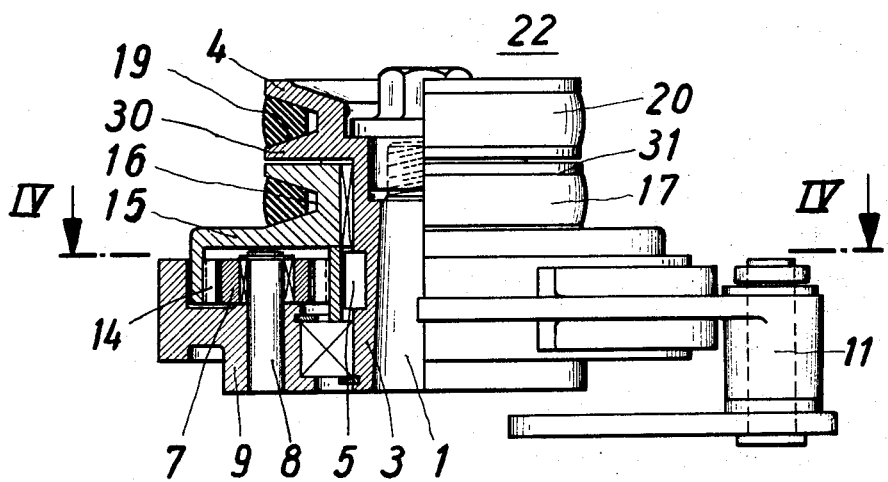
FIG. 4 shows another form of construction of the reversing gear of the invention, showing it in a partly sectioned plan view.
Figure 5:
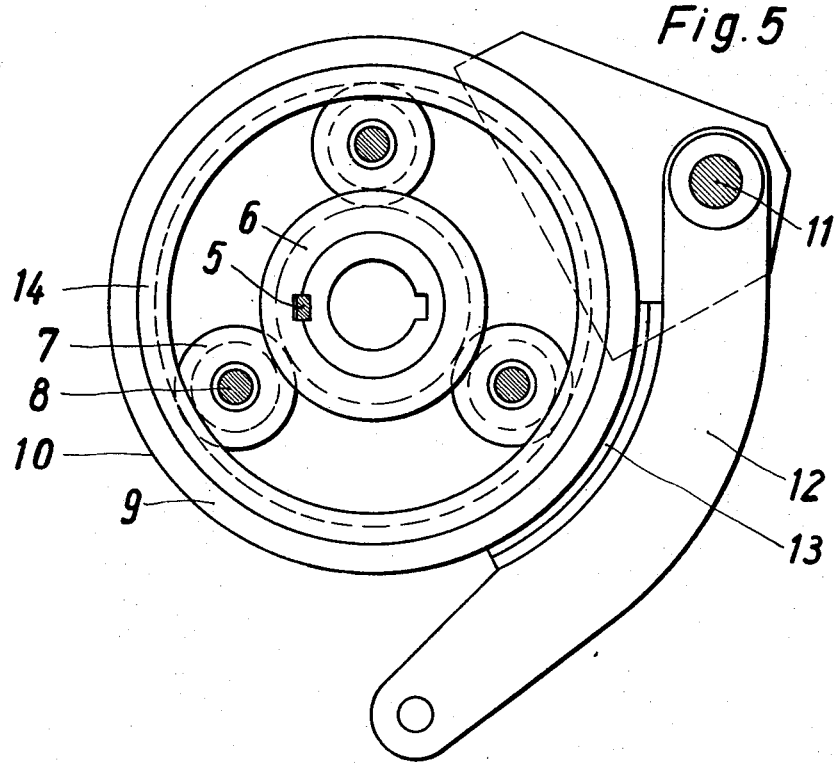
FIG. 5 shows the transmission of FIG. 4 in a section along the line IV—IV.
Figure 6:
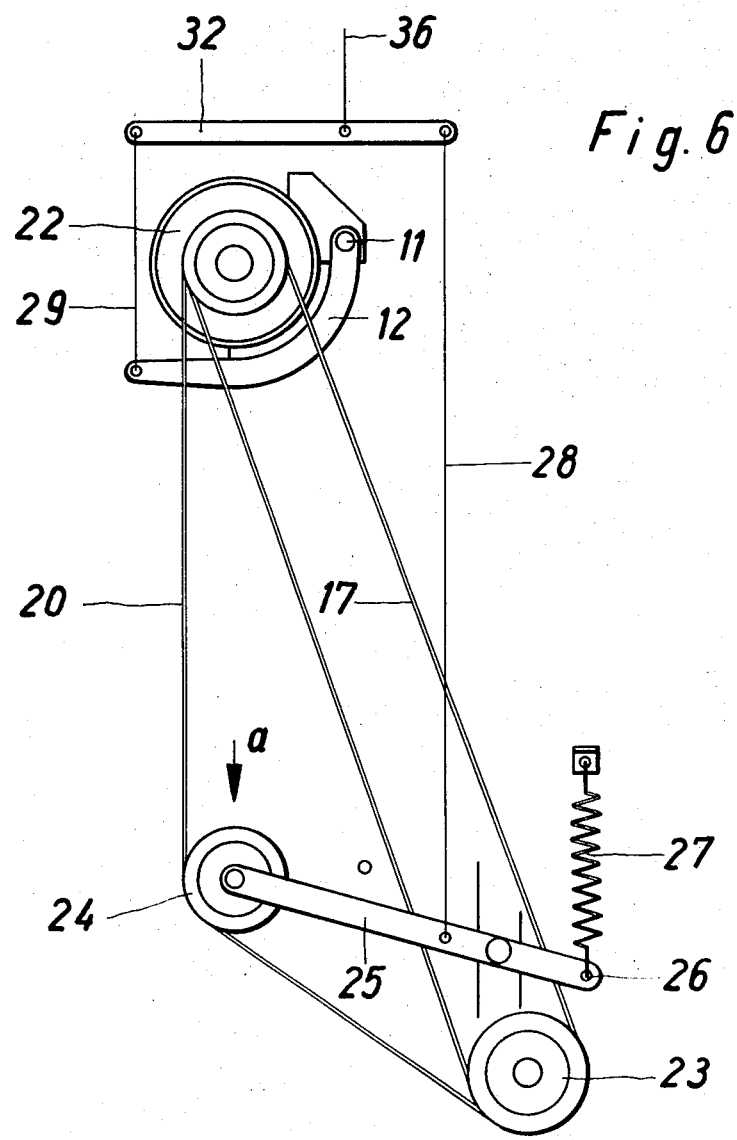
FIG. 6 shows the running of the belts with the transmission of FIGS. 4 and 5.

The form of construction of the reversing gear of FIGS. 4 to 6, in comparison with the just-described form of construction, has been slightly modified to make it necessary to run the belt 17 in another way, see FIG. 6. Instead of the dividing plane running through the bottom of the belt groove formed by the pulley 2 and the member 38 of FIG. 1, including the flanks 21 and 18, with the form of construction of FIG. 4 one single rotational element, represented by an undivided V-belt pulley formed by portions 4, 30, is provided with the groove 19 for the V-belt 20. The V-belt 20 is run around the drive-pulley 4, 30 of the transmission 22, around the tautening roller 24, and around the driven pulley 23. As in the case of the example previously described, the V-belt 17 connects the take-off pulley 31 of the bell 15 of the transmission 22 with the driven pulley 23 of FIG. 6.

The way in which this gear works is as follows:

With the V-belt 20 of FIG. 4 taut and with the brake 12, 13, loose, the turning moment exerted on the drive shaft 1 is transmitted directly to the drive pulley 4, 30 and from there by way of the V-belt 20 to its pulley 23. The planetary reduction-gear runs inoperatively. Forward travel is in its operative position.

With the V-belt 20 loose and the brake 12, 13 applied, in the case of FIG. 4 and as in the case of the form of construction of FIG. 1, the planetary drive functions as a geared-down reverse drive, and the V-belt 17 is driven, by the pulley 31 associated with the bell 15, in the reverse direction of rotation and at a speed corresponding to the design of the planetary drive. Because the belt 17 is always kept taut, the drive pulley 23 also turns in the reverse direction. Backward travel is shifted to.

With the V-belt 20 slackened and the brake 12, 13 loose, in the case of FIG. 4 as in the case of FIG. 1 there is no transmission of torque from the transmission 22 to the drive pulley 23. The planetary drive runs idly, and the slack V-belt 20 slips on the pulley 4, 30. Idling has been shifted to.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A reversing transmission for driving rotatable member from a drive shaft including a belt pulley drive and a planetary gear train, said gear train having a sun gear rotatable with the drive shaft, a rotatable planet gear carrier, at least one planet gear rotatably supported by said carrier and drivingly connected to said sun gear, and a brake for arresting the rotation of said carrier, the improvement comprising a first torque-transmitting rotational element mounted to said drive shaft and driving said sun gear; a second torque-transmitting rotational element coaxially rotatably supported by said first element and drivingly connected to said at least one planet gear, said first and second elements defining first and second pulleys with one of said pulleys being formed by adjacent sides of said first and second elements; first drive means connecting said rotatable member with one of said elements for driving said member in a first direction; second drive means selectively engageable with both of said elements for driving said member in a reverse direction relative to said first direction; and actuating means connected to said brake and said second drive means having a first position for engaging said second drive means and disengaging said brake and a second position for disengaging said second drive means and engaging said brake.

2. The reversing transmission as set forth in claim 1 wherein said actuating means has selective positions including said first and second positions for providing forward, reverse, and idle rotation to said rotatable member.

3. The reversing transmission as set forth in claim 1 wherein said pulleys are V-belt pulleys, and wherein one of said first and second drive means includes a V-belt connected to one of said V-belt pulleys.

4. The reversing transmission as set forth in claim 1 wherein said actuating means includes a belt-engaging mechanism and said second drive means includes a second belt connecting said mechanism and said pulleys.

5. The reversing transmission as set forth in claim 4 wherein said actuating means further includes a common control lever operatively connected to said belt-engaging mechanism and said brake.

6. The reversing gear as set forth in claim 4 wherein said belt engaging mechanism includes a double arm lever having one end spring loaded and the opposing end carrying a pulley for engaging one of the belts.

7. A reversing gear in accordance with claim 6, further including a common regulating organ and means for tautening at least one of said belts, said regulating organ controlling the arresting device and the repositioning force for the tautening means.

8. The gear according to claim 7 wherein said regulating organ includes a pivotable, lever member.

9. A reversing transmission for driving a rotatable member from a drive shaft including a belt pulley drive and a planetary gear train having a sun gear rotatable with the drive shaft, a rotatable planet gear carrier, at least one planet gear rotatably supported by said carrier and drivingly connected to said sun gear, and a brake for arresting the rotation of said carrier, the improvement comprising a first torque-transmitting rotational element mounted to said drive shaft and driving said sun gear, said first element defining a first portion of a V-belt pulley; a second torque-transmitting element defining an internal gear portion drivingly connected to said at least one planet gear, said second element further defining a second portion of the V-belt pulley; drive means for drivingly connecting said rotatable member to said second element; a V-belt located in said V-belt pulley; and actuating means having a first position for selectively driving said rotatable member in a first direction and a second position for driving said rotatable member in a reverse direction, said actuating means including belt-tautening means for engaging said V-belt with said first and second portions of said V-belt pulley in said first position and disengaging said V-belt in said second position.

10. The reversing transmission so set forth in claims 9 wherein said actuating means functions includes common regulating means for selectively operating said belt-tauntening means and said brake.

11. A reversing transmission for driving a rotatable member from a drive shaft including a belt pulley drive and a planetary gear train, said gear train having a sun gear rotatable with the drive shaft, a rotatable planet gear carrier, at least one planet gear rotatably supported by said carrier and drivingly connected to said sun gear, and a brake for arresting the rotation of said carrier, the improvement comprising a first torque-transmitting element mounted to said drive shaft and driving said sun gear, said first element defining a first V-belt pulley; a second torque-transmitting element rotatably supported by said first element and defining a second V-belt pulley, said second element further including an internal gear portion drivingly connected to said at least one planet gear, first drive means connecting said second element and said rotatable member, and second drive means including a belt-engaging mechanism for selectively drivingly connecting said first element, said mechanism, and said rotatable member.

12. The reversing transmission as set forth in claim 11 wherein said second drive means further includes common control means for operating said belt-engaging mechanism and said brake.

* * * * *